(12) United States Patent
Ranganathan et al.

(10) Patent No.: US 7,647,516 B2
(45) Date of Patent: Jan. 12, 2010

(54) POWER CONSUMPTION MANAGEMENT AMONG COMPUTE NODES

(75) Inventors: Parthasarathy Ranganathan, Fremont, CA (US); Khaldoun Alzien, Houston, TX (US); Phillip Leech, Houston, TX (US); Charles Shaver, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 443 days.

(21) Appl. No.: 11/232,526

(22) Filed: Sep. 22, 2005

(65) Prior Publication Data

US 2007/0067657 A1 Mar. 22, 2007

(51) Int. Cl.
G06F 1/00 (2006.01)
G06F 1/26 (2006.01)
G06F 1/32 (2006.01)
G06F 15/173 (2006.01)

(52) U.S. Cl. .................. 713/320; 713/300; 713/340; 709/223

(58) Field of Classification Search .............. 713/300, 713/320, 340; 709/223
See application file for complete search history.

(56) References Cited

U.S. PATENT DOCUMENTS

| 5,339,445 | A | 8/1994 | Gasztonyi | |
| 6,477,388 | B1 * | 11/2002 | Schmutz | 455/522 |
| 6,574,740 | B1 * | 6/2003 | Odaohhara et al. | 713/323 |
| 6,594,771 | B1 * | 7/2003 | Koerber et al. | 713/330 |
| 6,859,882 | B2 | 2/2005 | Fung | |
| 6,934,864 | B2 | 8/2005 | Chu et al. | |
| 6,986,069 | B2 * | 1/2006 | Oehler et al. | 713/320 |
| 7,024,567 | B2 * | 4/2006 | Kim et al. | 713/300 |
| 7,240,223 | B2 | 7/2007 | de Cesare et al. | |
| 2003/0005339 | A1 * | 1/2003 | Cohen et al. | 713/300 |
| 2003/0056126 | A1 * | 3/2003 | O'Connor et al. | 713/300 |
| 2003/0065958 | A1 * | 4/2003 | Hansen et al. | 713/300 |
| 2004/0163001 | A1 * | 8/2004 | Bodas | 713/300 |
| 2004/0268166 | A1 * | 12/2004 | Farkas et al. | 713/320 |
| 2005/0102544 | A1 | 5/2005 | Brewer et al. | |
| 2005/0138438 | A1 | 6/2005 | Bodas | |
| 2005/0177755 | A1 | 8/2005 | Fung | |
| 2005/0182986 | A1 * | 8/2005 | Anderson et al. | 713/340 |
| 2006/0143612 | A1 * | 6/2006 | Cromer et al. | 718/100 |
| 2007/0050644 | A1 * | 3/2007 | Merkin | 713/300 |

OTHER PUBLICATIONS

Felter, W. et al., "A Performance-Conserving Approach for Reducing Peak Power Consumption in Server Systems", Jun. 2005, ICS '05, Boston, MA.

* cited by examiner

*Primary Examiner*—Ji H Bae

(57) ABSTRACT

In a method for managing power consumption among compute nodes having respective power components, an increase in the power utilization of a first compute node of the compute nodes may be detected. In response to a detected increase, a sum of the power consumption levels of the compute nodes and the requested increase in power utilization of the first compute node is compared with an allowable power budget for a compute node pool. In addition, the power state of the first compute node power component is varied in response to the comparison.

18 Claims, 9 Drawing Sheets

POWER CONSUMPTION MANAGEMENT AMONG COMPUTE NODES

CROSS-REFERENCES

This application is related to U.S. patent application Ser. No. 11/232,525, entitled "Agent for Managing Power Among Electronic Systems", filed by Parthasarathy Ranganathan et al. on Sep. 22, 2005, the disclosure of which is hereby incorporated by reference in its entirety.

BACKGROUND

Blade servers (or blade PCs) represent a fast growing segment in the computing industry because of the compaction, consolidation, modularity, management, and maintenance afforded by the blade servers. The growth in the use of blade servers has, however, led to ever increasing challenges in efficiently powering and cooling the blade servers. The challenges include attempts at minimizing the relatively high operational capital and recurring costs associated with enterprise environments having a relatively large number of blade servers. The challenges also include attempts at extending the useful lives of the blade servers by maintaining their temperatures within prescribed limits.

Heretofore, computer systems generally and blade servers in particular, have not been power managed to maintain performance and reduce power consumption. Instead, these components are typically over-provisioned so as to be able to meet peak demands, which means that they consume relatively large amounts of power while doing little or no useful work. Operation of these components at the over-provisioned levels has required that cooling resources also be increased to meet the higher demands, thereby increasing the inefficiencies associated with current computer system operations.

A technique for operating computer systems generally, and blade systems in particular, such that the costs associated with powering and cooling the computer systems are substantially minimized would therefore be beneficial.

SUMMARY OF THE INVENTION

A method for managing power consumption among compute nodes having respective power components is described herein. In the method, an increase in the power utilization of a first compute node of the compute nodes may be detected. In response to a detected increase, a sum of the power consumption levels of the compute nodes and the requested increase in power utilization of the first compute node is compared with an allowable power budget for a compute node pool. In addition, the power state of the first compute node power component is varied in response to the comparison.

BRIEF DESCRIPTION OF THE DRAWINGS

Features of the present invention will become apparent to those skilled in the art from the following description with reference to the figures, in which.

DETAILED DESCRIPTION OF THE INVENTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

As described in greater detail herein below, the amounts of power consumed by compute nodes may be managed such that the total power consumption level may substantially be maintained below a power budget limit. In a first example, the amounts of power consumed may be managed according to a substantially pre-emptive strategy where the power utilization levels of the compute nodes are increased if the increase will not cause the total power consumption level to exceed the power budget limit. In a second example, the amounts of power consumed may be managed according to a substantially reactive strategy where the power utilization levels of one or more of the compute nodes may be reduced if it is determined that a current power consumption level exceeds the power budget limit. In addition, the power utilization levels of one or more of the compute nodes 120 may be reduced if a thermal event is detected.

Figure 1A:
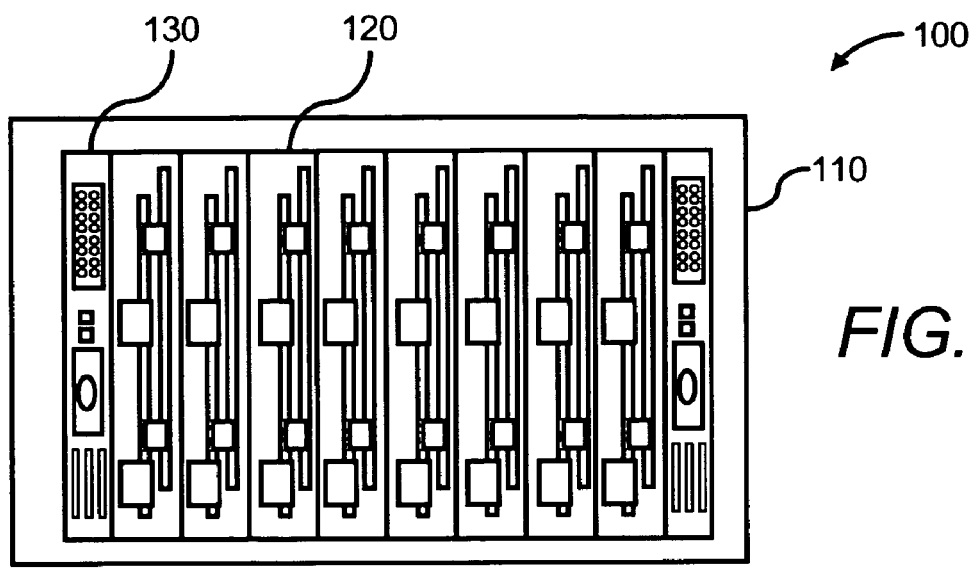
FIG. 1A shows a simplified frontal view of an electronic environment in which various embodiments of the invention may be practiced, according to an embodiment of the invention.

With reference first to FIG. 1A, there is shown a simplified frontal view of an electronic environment 100 in which various embodiments of the invention may be practiced. The electronic environment 100 depicted in FIG. 1A generally comprises an enclosure 110 housing a number of compute nodes 120, such as, computer systems, servers, memories, hard drives, etc. In FIG. 1A, however, the compute nodes 120 are depicted as comprising blade PCs arranged in horizontal alignment with respect to each other in the enclosure 110. The compute nodes 120 are also depicted as including various components generally known to form part of conventional electronic systems, such as, various connectors, buttons, indicators, etc.

In addition to the compute nodes 120, the enclosure 110 may include other components, such as, interconnects 130. The interconnects 130 generally operate to route network signals from the compute nodes 120. Two interconnects 130 may be provided to provide redundancy for the compute nodes 120.

Although eight compute nodes 120 and two interconnects 130 have been illustrated as being contained in the enclosure 110, any reasonably suitable number of compute nodes 120 and interconnects 130 may be included in the enclosure without departing from a scope of the invention. In addition, the electronic environment 100 may include additional components and some of the components depicted may be removed and/or modified without departing from a scope of the electronic environment 100.

It should also be understood that various embodiments of the invention may be practiced in electronic environments having different configurations than the electronic environment 100 depicted in FIG. 1A. By way of example, various embodiments of the invention may be practiced in electronic environments having different types of compute nodes 120, for instance, in electronic environments having horizontally arranged servers. In addition, or alternatively, various embodiments of the invention may be practiced in a larger scale computing environment in comparison with the electronic environment 100 depicted in FIG. 1A.

Figure 1B:
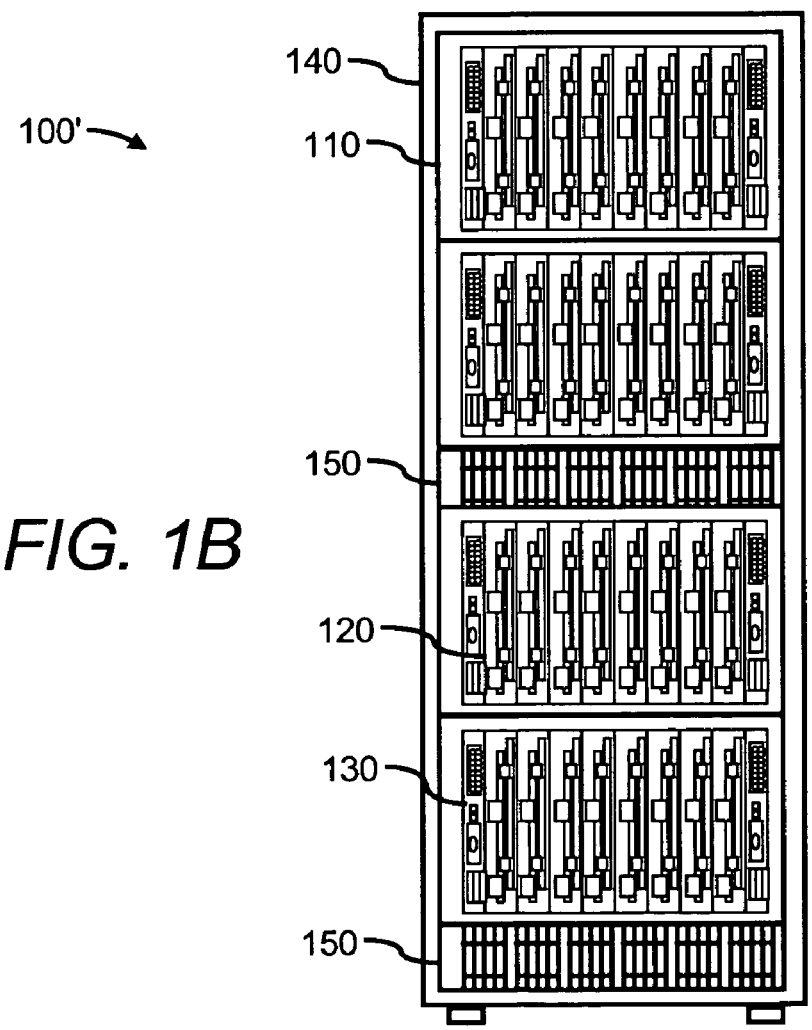
FIG. 1B illustrates a simplified frontal view of another electronic environment in which various embodiments of the invention may be practiced, according to an embodiment of the invention.

An example of a larger scale electronic environment 100' is depicted in FIG. 1B. More particularly, FIG. 1B illustrates a simplified frontal view of a rack 140, such as, an electronics cabinet, housing four enclosures 110. The rack 140 is also depicted as including two sets of power supplies 150. The rack 140 may, however, house any reasonably suitable number of enclosures 110, such as, six, eight, or more, as well as any reasonably suitable number of power supplies 150. In addition, the enclosures 110 included in the rack 140 may also house any reasonably suitable number of compute nodes 120.

Various embodiments of the invention may further be practiced in electronic environments containing a relatively larger number of compute nodes 120 than are depicted in FIG. 1B. For instance, various embodiments of the invention may be practiced amongst compute nodes contained in a data center or compute nodes positioned at different geographic locations with respect to each other. The different geographic locations may include, for instance, different rooms, different buildings, different counties, different countries, etc.

Figure 2:
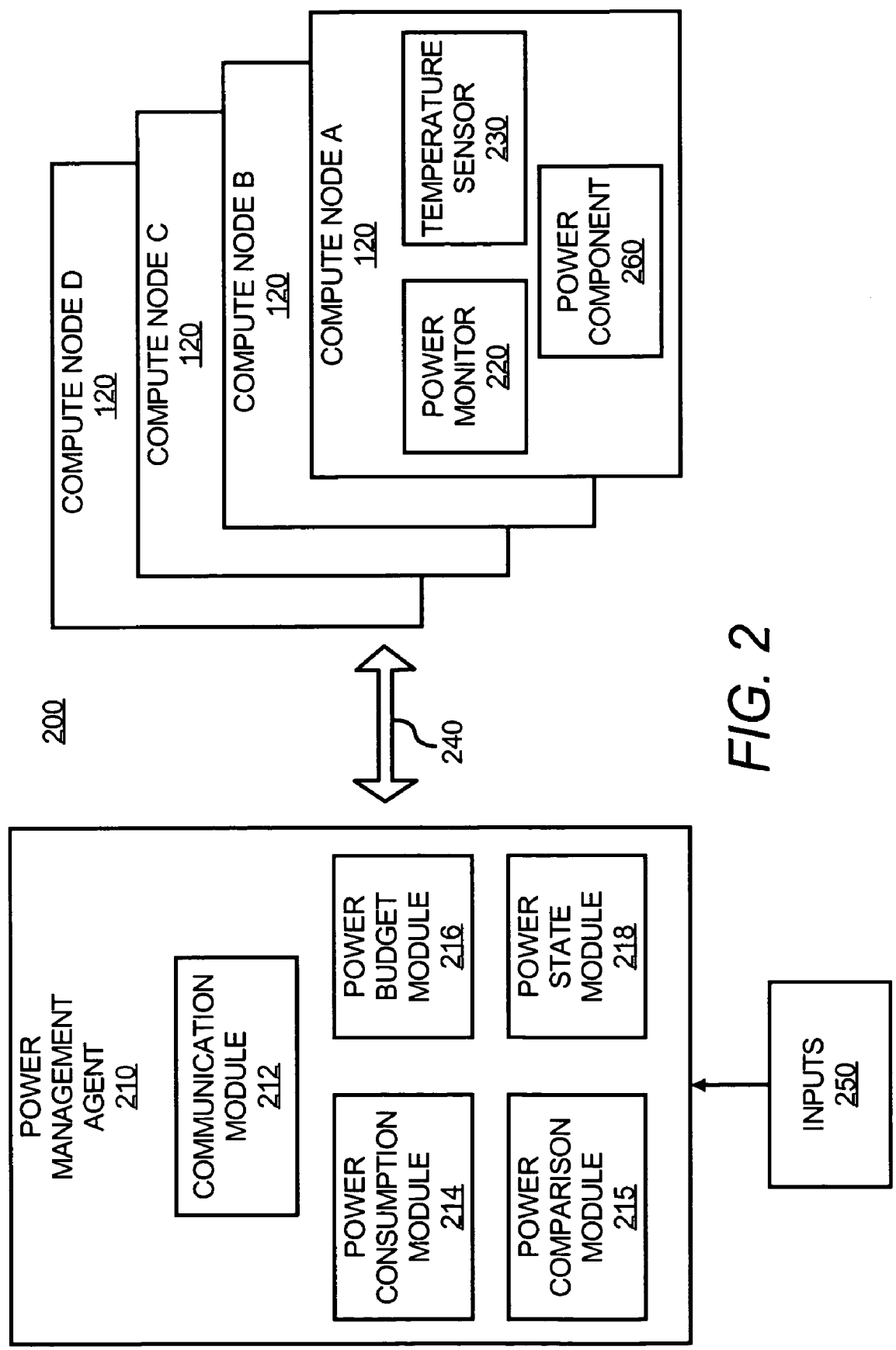
FIG. 2 illustrates a block diagram of a power management system according to an embodiment of the invention.

With reference now to FIG. 2, there is shown a block diagram of a power management system 200 according to an example of the invention. It should be understood that the following description of the power management system 200 is but one manner of a variety of different manners in which such a power management system 200 may be operated. In addition, it should be understood that the power management system 200 may include additional components and that some of the components described may be removed and/or modified without departing from a scope of the power management system 200.

The following description of the power management system 200 makes specific reference to the elements depicted in the electronic environments 100, 100'. It should, however, be understood that the power management system 200 may be implemented in environments that differ from those environments 100, 100' depicted in FIGS. 1A and 1B, as described above.

As shown in FIG. 2, the power management system 200 includes a power management agent 210. The power management agent 210 is depicted as including a communication module 212, a power consumption module 214, a power comparison module 215, a power budget module 216, and a power state module 218, which the power management agent 210 may implement in performing various functions as described below. Some or all of the modules 212-218 may comprise software stored either locally or in an external memory which the power management agent 210 may implement. In addition, or alternatively, some or all of the modules 212-218 may comprise one or more hardware devices that may be implemented by the power management agent 210.

As such, for example, the power management agent 210 may be stored at a single location or the power management agent 210 may be stored in a distributed manner across multiple locations, where the locations comprise at least one of hardware and software.

Generally, speaking, the power management agent 210 is configured to enforce various conditions among the compute nodes 120, one of which is a power budget, as described in greater detail herein below. The power management agent 210 may comprise, for instance, a centralized module in an enclosure manager (not shown) of an enclosure 110 or as a distributed control agent on one or more of the individual compute nodes 120. In addition, or alternatively, the power management agent 210 may comprise a control agent stored in one or more compute nodes outside of an enclosure 110.

In any regard, the communication module 212 is configured to enable communications between the power management agent 210 and a plurality of compute nodes 120. The communication module 212 may comprise software and/or hardware configured to act as an interface between the power management agent 210 and at least one other power management agent. The at least one other power management agent may be located, for instance, in relatively close proximity to the power management agent 210, in a different geographic location as compared to the power management agent 210, etc. Communications between the power management agent 210 and the at least one other power management agent may include communications of power thresholds, policy recommendations, etc. In this regard, for instance, operations of the power management agent 210 described in greater detail herein below may be performed by one or more power management agents 210.

The communication module 212 may also comprise software and/or hardware configured to act as an interface between the power management agent 210 and the plurality of compute nodes 120 to thereby enable the communications. In one example, the power management agent 210 is configured to receive information pertaining to the amount of power being consumed by each of the compute nodes 120. The amount of power being consumed by each of the compute nodes 120 may be detected through use of power monitors 220 associated with each of the compute nodes 120. The power monitors 220 may comprise, for instance, relatively simple current sense resistors connected to an analog-to-digital converter. In addition, or alternatively, the power monitors 220 may comprise software configured to calculate the amounts of power consumed by the compute nodes 120.

The power management agent 210 may also receive information pertaining to the temperatures of the compute nodes 120. The temperatures of the compute nodes 120 may be detected by one or more temperature sensors 230, which may include, for instance, thermometers, thermistors, thermocouples, or the like.

Information pertaining to the amount of power being consumed by the compute nodes 120 and the temperatures of the compute nodes 120 may be transmitted to the power management agent 210 as indicated by the arrow 240. In this regard, the arrow 240 may represent, for instance, a network, a bus, or other communication means configured to enable communications between the power management agent 210 and the compute nodes 120. In addition, the arrow 240 may represent communication means between the power management agent 210 and compute nodes 120 housed in one or more enclosures 110, one or more racks 140, one or more data centers, etc. As such, for instance, the power management agent 210 may enforce a power budget across multiple compute nodes 120, regardless of their geographic locations with respect to each other and the power management agent 210.

The power management agent 210 may implement the power consumption module 214 to monitor the current power consumption levels of the compute nodes 120. The power management agent 210 may also implement the power consumption module 214 to compare the current power consumption levels with a power budget. In addition to the current power consumption levels, the power management agent 210 may also implement the power comparison module 215 to compare pending increases in the power utilization levels of the compute nodes with the power budget.

The power management agent 210 may also receive inputs 250 from one or more sources. For instance, the power management agent 210 may receive the terms of a service level agreement ("SLA") and power budget levels from an administrator or from a program configured to supply the power management agent 210 with the SLA terms and power budget levels. The power management agent 210 may also receive information pertaining to current or pending utilization levels of the compute node 120 power components 260. The power components 260 may comprise, for instance, processors, memories, disk drives, or other device in the compute nodes 120 whose power state may be detected and varied. In addition, the power components 260 may have a plurality of power states. For instance, the power components 260 may have a minimum power state, such as, when the power components 260 are idle and a maximum power state, such as, when the power components 260 are fully operational. In addition, for instance, the power components 260 may have one or more power states between the minimum power state and the maximum power state, at which the power components 260 may be operated.

The power management agent 210 may implement the power budget module 216 to determine the power budget and the power budget threshold enforced by the power management agent 210 at design time or at run-time. The power budget may be determined at design time based upon various constraints of the electronic environment 100, 100' if, for instance, the targeted benefits of the power budget enforcement are geared towards reducing the provisioning of cooling and power delivery or increasing flexibility in the choice of components selected for the electronic environment 100, 100'. For example, reverse calculations from a specific cooling or power delivery budget may be implemented to determine the selected power budget value and associated power budget threshold.

The power management agent 210 may receive the current or pending power component 260 utilization levels from, for instance, a workload managing module (not shown) configured to direct workloads to the compute nodes 120. In addition, or alternatively, current or pending utilization levels may directly be transmitted to the compute nodes 120 and the compute nodes 120 may communicate the current or pending utilization levels to the power management agent 210.

The power management agent 210 may implement the power state module 218 to determine the power states for the compute nodes 120, such that the compute nodes 120 are operated in manners that reduce the power consumption levels of the compute nodes 120 while substantially ensuring that other system requirements are not unduly compromised. The other system requirements may include, for instance, reliability requirements, such as, adherence to a pre-specified power budget, performance requirements, or other quality-of-service metrics specified by an application, such as the requirements set forth in an SLA.

As described in greater detail herein below, the power management agent 210 may throttle the compute nodes 120 according to a pre-emptive strategy or a reactive strategy. An example of the pre-emptive strategy is set forth in the method 400 depicted in FIGS. 4A and 4B and an example of the reactive strategy is set forth in the method 500 depicted in FIGS. 5A-5D. The power management agent 210 may also determine when the throttling of the compute nodes 120 is triggered, such as, when either or both of a power threshold and a temperature threshold is exceeded. In addition, the power management agent 210 may determine which of the compute nodes 120 are to be throttled. For instance, the power management agent 210 may select the compute nodes 120 with the highest utilization, the compute nodes 120 with the lowest utilizations, compute nodes 120 that have not previously been throttled, etc. The power management agent 210 may, moreover, control how the compute nodes 120 are throttled, such as, CPU throttling, memory throttling, disk throttling, etc., as well as the levels to which the compute nodes 120 are throttled, for instance, one power state, two power states, etc. In other words, the power management agent 210 may control the throttling of the compute nodes 120, for instance, by varying the voltage and frequency of one or more processors, by varying the power states or the disk spin rates of memories contained in the compute nodes 120, by varying which of the components contained in the compute nodes 120 are activated and deactivated, by using the heterogeneity in the components contained in the compute nodes 120, etc. In addition, the power management agent 210 may control the throttling of the compute nodes 120 such that their power states are varied in at least one of an incremental and a non-incremental manner.

Figure 3:
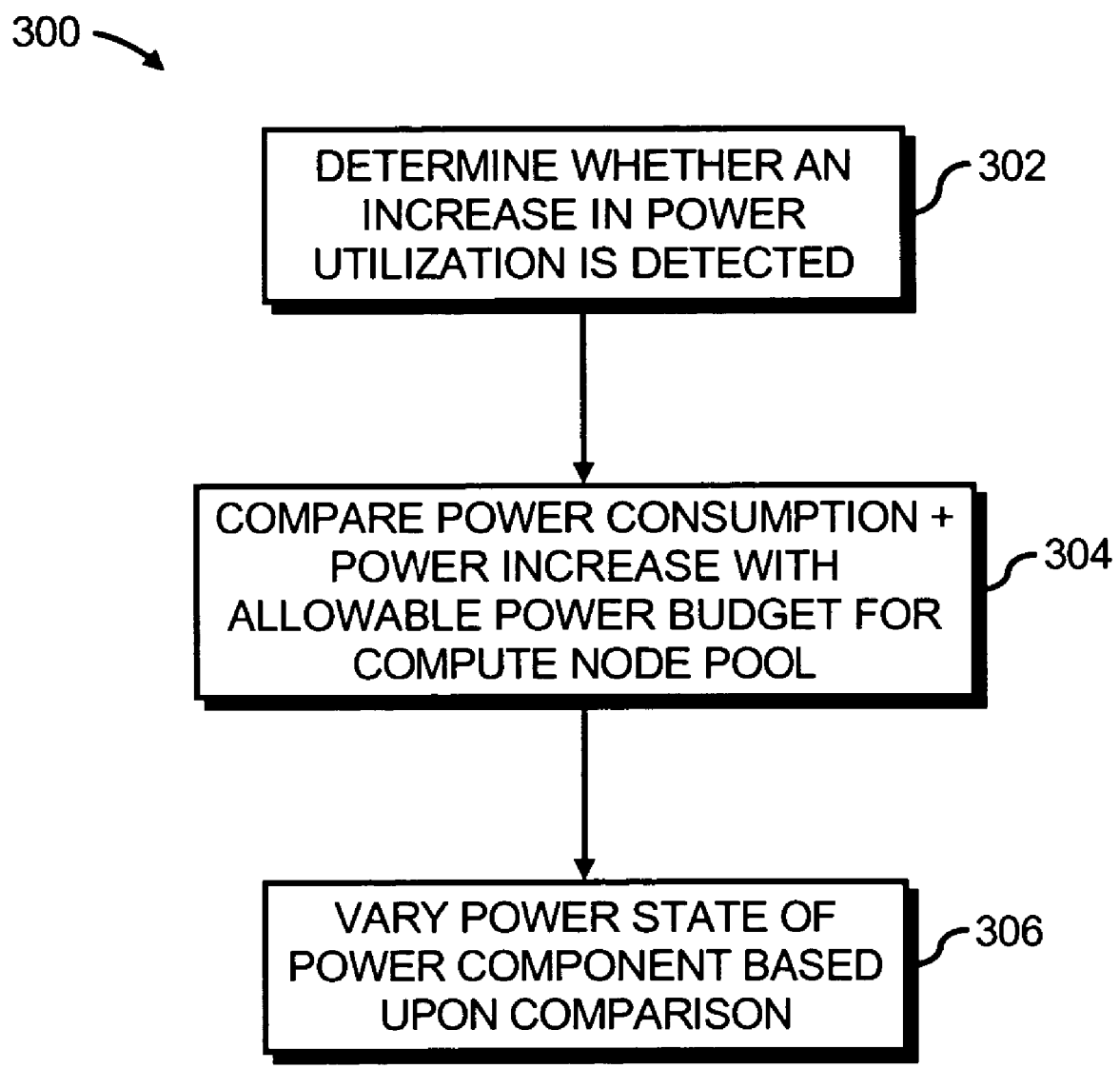
FIG. 3 illustrates a flow diagram of a method for managing power consumption among compute nodes, according to an embodiment of the invention.

With reference first to FIG. 3, however, there is shown a flow diagram of a method 300 for managing power consumption among compute nodes 120, according to an example. As described above with respect to the power management system 200 depicted in FIG. 2, the compute nodes 120 each include one or more power components 260 configured to operate at one of a plurality of different power states.

As shown in FIG. 3, at step 302, a determination as to whether a first compute node 120 power component 260 utilization increase has been detected. A determination of whether a compute node 120 power component 260 utilization increase has been detected may be made, for instance, if one or both of the power management agent 210 and the compute node 120 receives an indication that the compute node 120 has been selected or is otherwise scheduled to perform a computing task requiring an increase in power utilization.

In response to a determination that an increase in power utilization has been detected, a sum of the power consumption levels of the compute nodes and the requested increase in power utilization of the first compute node may be compared with an allowable power budget for a compute node pool containing the compute nodes, as indicated at step 304. The power state of the first compute node power component may be varied in response to the comparison, as indicated at step 306.

Some of the steps outlined in the method 300 are described in greater detail herein below with respect to the methods 400 and 500. More particularly, the method 400 manages power consumption among the compute nodes 120 according to a substantially pre-emptive strategy. In other words, under the method 400, the compute nodes 120 may be operated such that their power utilization levels are increased if it is determined that such an increase will not cause the power consumption levels of the compute nodes 120 in a compute node pool to exceed a power budget limit. The method 500 manages power consumption according to a substantially reactive strategy. Under the method 500, the power utilization levels of one or more of the compute nodes 120 may be reduced if it is determined that a current power consumption level of the compute nodes 120 in a compute node pool exceeds a power budget limit. In addition, the power utilization levels of one or more of the compute nodes 120 may be reduced if a thermal event is detected.

Figure 4A:
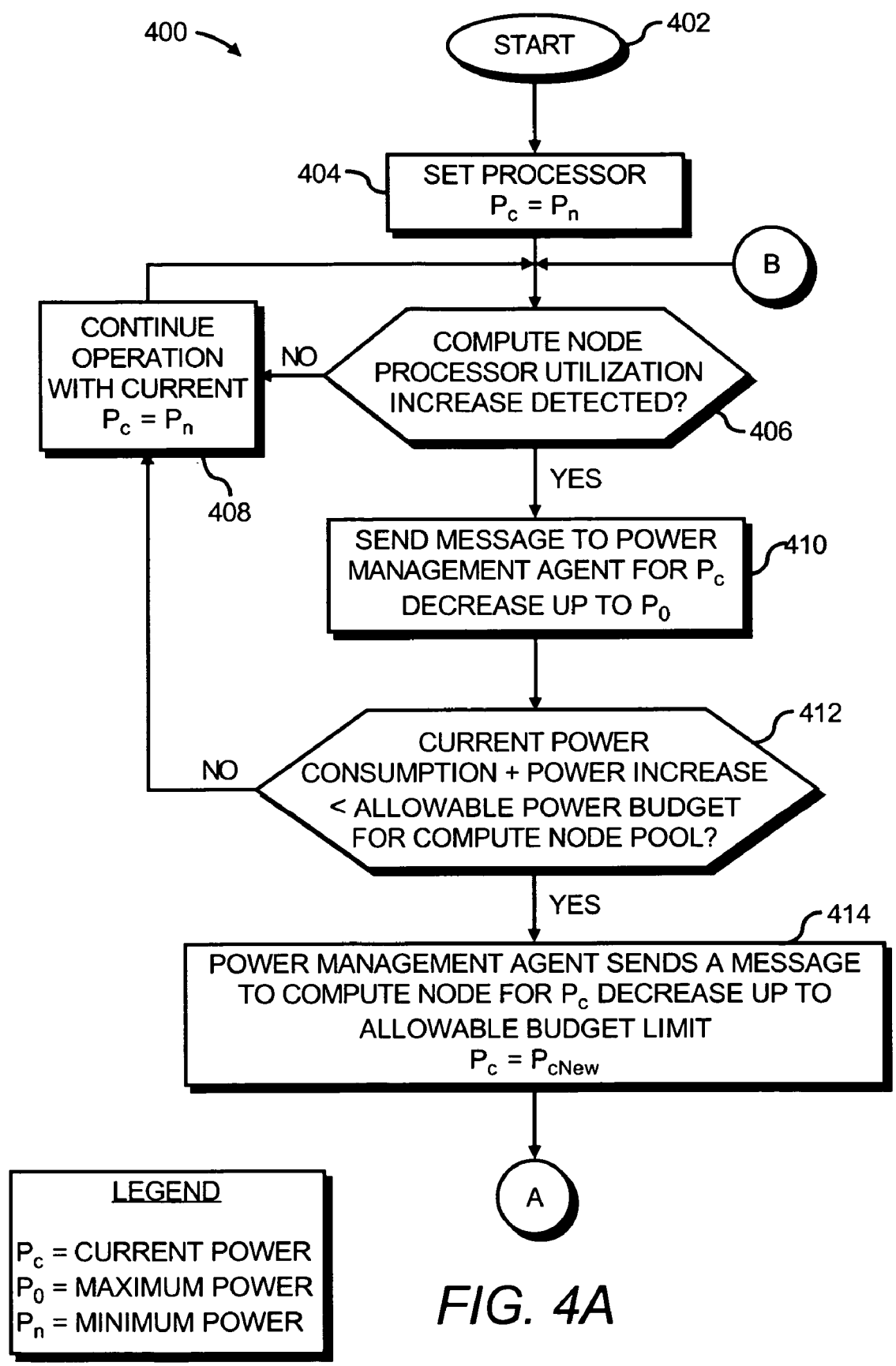
FIGS. 4A and 4B, collectively, show a flow diagram for managing power consumption among compute nodes, which depicts the steps in the flow diagram of FIG. 3 in greater detail, according to a first example.
Figure 4B:
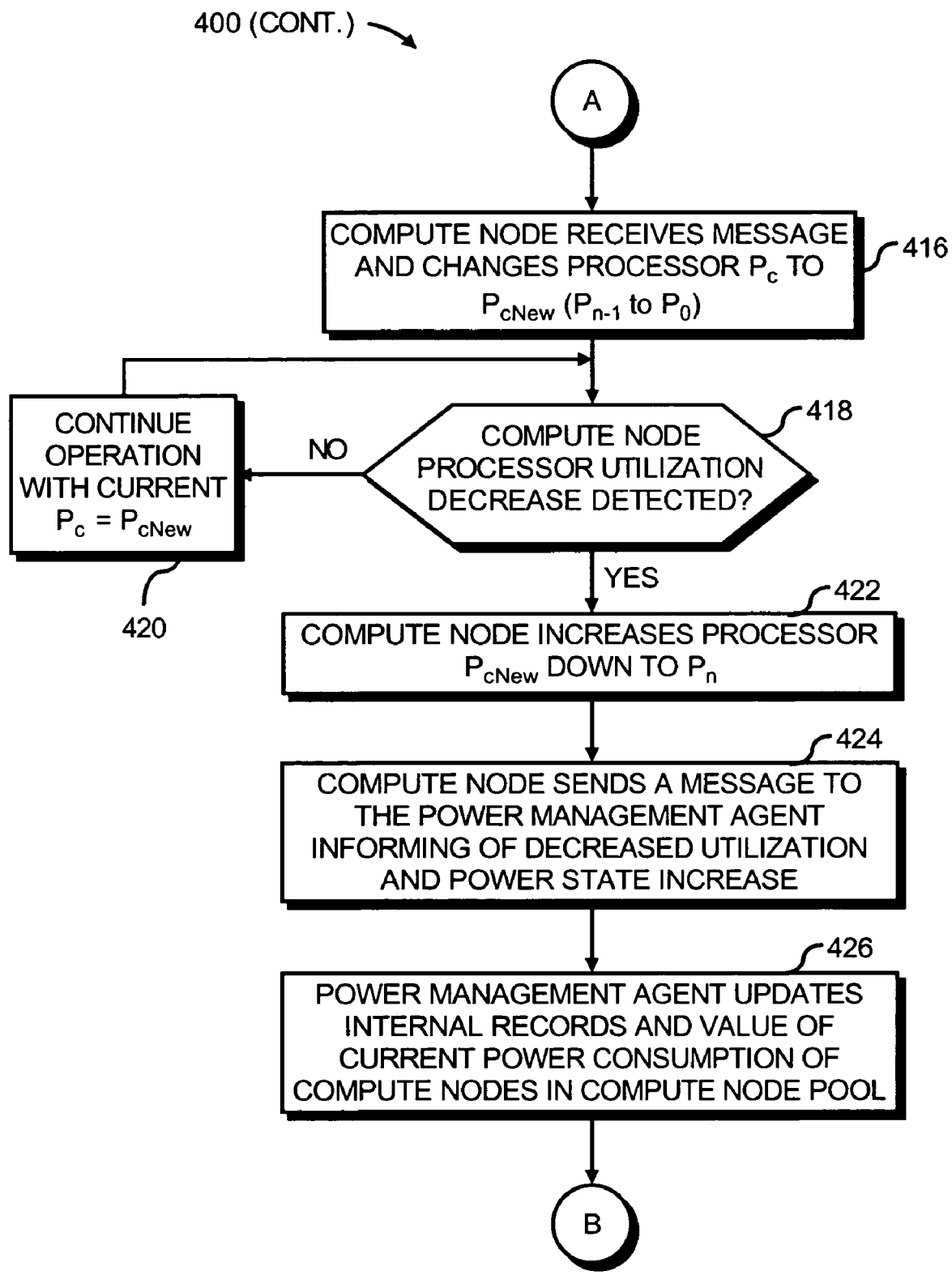

Turning now to FIGS. 4A and 4B, there is shown, collectively, a flow diagram of a method 400 for managing power consumption among compute nodes, which depicts the steps in the flow diagram of FIG. 3 in greater detail, according to a first example. In addition, FIGS. 5A-5D shows, collectively, a flow diagram of a method 500 for managing power consumption among compute nodes, which depicts the steps in the flow diagram of FIG. 3 in greater detail, according to a second example. It is to be understood that the following descriptions of the methods 400 and 500 are but two manners of a variety of different manners in which examples of the invention may be practiced. It should also be apparent to those of ordinary skill in the art that the methods 400 and 500 represent generalized illustrations and that other steps may be added or existing steps may be removed, modified or rearranged without departing from the scopes of the methods 400 and 500.

The descriptions of the methods 400 and 500 are made with reference to the power management system 200 illustrated in FIG. 2, and thus makes reference to the elements cited therein. It should, however, be understood that the methods 400 and 500 are not limited to the elements set forth in the power management system 200. Instead, it should be understood that the methods 400 and 500 may be practiced by a system having a different configuration than that set forth in the power management system 200.

The power management agent 210 and the compute nodes 120 may implement one or both of the methods 400 and 500 to substantially reduce the power consumption levels of the compute nodes 120 contained in a compute node pool, while substantially ensuring that other system requirements are not unduly compromised. The compute node pool may include a plurality of compute nodes 120 in communication with the power management agent 210. As such, the compute nodes 120 of the compute node pool may comprise the compute nodes 120 contained in a single or multiple enclosures 110. In addition, or alternatively, the compute nodes 120 of the compute node pool may include compute nodes 120 positioned in different geographic locations with respect to each other.

In the following descriptions of the methods 400 and 500, particular reference is made to throttling of the compute nodes 120 through changing of the power component 260 power states, where the power component 260 comprises a processor. The compute nodes 120 may, however, also be throttled through changing of the power states of one or more other components contained in the compute nodes 120. The other components may include, for instance, memories, disks, etc. In this regard, it should be understood that throttling of the compute nodes 120 through manipulation of the processor 260 power states is one example through which the methods 400 and 500 may be implemented and that other components of the compute nodes 120 may be manipulated in similar manners to achieve similar results. It should therefore be understood that the changes to the processor 260 power states described with respect to the methods 400 and 500 may be exchanged or included with changes to one or more of the other components.

With particular reference first to FIGS. 4A and 4B, the method 400 may be initiated at step 402 in response to any of a number of stimuli or conditions. For instance, the method 400 may be initiated with activation of the components in the compute nodes 120 of the compute node pool. In addition, or alternatively, the method 400 may be manually initiated or the power management agent 210 may be programmed to initiate the method 400 at various times, for a set duration of time, substantially continuously, etc.

Once initiated, the current power state ($P_c$) of a compute node 120 processor 260 may be set to a minimum processor state ($P_n$), as indicated at step 404. The minimum processor state ($P_n$) may include a minimum frequency and voltage point, and power consumption level of the processor 260. At step 406, it may be determined as to whether a compute node 120 processor 260 utilization increase has been detected. A determination of whether a compute node 120 processor 260 utilization increase has been detected may be made, for instance, if one or both of the power management agent 210 and the compute node 120 receives an indication that the compute node 120 has been selected or is otherwise scheduled to perform a computing task requiring an increase in at least one of processor and subsystem performance, thus translating to increased power utilization. In this regard, one or both of the power management agent 210 and the compute node 120 may include means for determining whether a processor 260 utilization increase has been detected.

If a compute node 120 processor 260 utilization increase has not been detected at step 406, the compute node 120 may continue operating at the current power state ($P_c=P_n$), as indicated at step 408. In addition, the compute node 120 may continue operating at the current power state ($P_c=P_n$) until a processor 260 utilization increase is detected at step 406.

If a compute node 120 processor 260 utilization increase has been detected at step 406, the compute node 120 may send a message to the power management agent 210 to request that the power state ($P_c$) be decreased to a level up to a maximum processor state ($P_0$), as indicated at step 410. The maximum processor state ($P_0$) may include a maximum frequency and voltage point, and power consumption level of the processor 260. The level to which the power state ($P_c$) is to be decreased may be based upon, for instance, one or more of the following factors. By way of example, a relatively simple algorithm may decrease the power state ($P_c$) to the next lowest power state (Pc-1). As another example, a relatively more sophisticated algorithm may select the power state ($P_c$) based upon the amount of processing resources required by the processor 260 utilization increase at step 406.

As relied upon throughout the present disclosure, a decrease in the power state ($P_c$) of a processor 260 indicates an increase in power utilization of the processor 260 and an increase in the power state ($P_c$) of a processor 260 indicates a decrease in power utilization of the processor 260. This correlation between power state and power utilization is based upon the minimum processor state ($P_n$) having the highest power state number and the maximum processor state ($P_0$) having the lowest power state number. As such, a decrease in power state ($P_c$) is equivalent to an increase in power utilization.

The power management agent 210 may determine whether the sum of the current power consumption levels of the compute nodes 120 in the compute node pool and the requested power increase in the compute node 120 falls below an allowable power budget for the compute node pool, as indicated at step 412. The allowable power budget and an associated allowable power budget limit for the compute node pool may be determined at design time or they may comprise run-time configurable system parameters. The allowable power budget and associated limit may be determined at design time based upon various constraints of the electronic environment 100, 100' if, for instance, the targeted benefits of the power budget enforcement are geared towards reducing the provisioning of cooling and power delivery or increasing flexibility in the choice of components selected for the electronic environment 100, 100'. For example, reverse calculations from a specific cooling or power delivery budget may be implemented to determine the allowable power budget.

In other instances, the allowable power budget and associated limit of the compute node pool may comprise a run-time parameter that is varied based on an external trigger, such as, a power supply failure, reduced resource utilizations, etc. In addition, the specific value and the level of rigidity in the enforcement of the power budget may depend upon the objective function being optimized and the level of aggressiveness in the design of components included in the electronic environment 100, 100'. For example, the system power budget may be set to a power budget value close to the estimated $90^{th}$ percentile of typical usage of the expected workloads, determined, for instance, through profiling, with an "allowance factor" for unexpected transients. In this example, more conservative power budget value settings may use an estimate of the peak values while more aggressive approaches may use the estimated average power consumption values. Similarly, optimizations targeting cooling and average power may be more relaxed about brief transients when the power budget is not enforced versus optimizations targeting power delivery.

If the power management agent 210 determines that the sum of the current power consumption level and the requested power increase for the compute node 120 exceeds the allowable power budget, which equates to a "no" condition at step 412, that compute node 120 may continue operating at the current power state ($P_c=P_n$), as indicated at step 408. Again, the compute node 120 may continue operating at the current power state ($P_c=P_n$) until a processor 260 utilization increase for the compute node 120 is detected at step 406.

If, however, the power management agent 210 determines that the sum of the current power consumption level and the requested power increase for the compute node 120 falls below the allowable power budget, the power management agent 210 may send a message to the compute node 120 to decrease its power state ($P_c$) to a level up to the allowable power budget limit, as indicated at step 414. In other words, the power management agent 210 may send a message to the compute node 120 to vary its power state ($P_c$) to a new power state ($P_{cNew}$), where the new power state ($P_{cNew}$) comprises a power state that falls between the minimum processor state minus one state ($P_{n-1}$) and the maximum processor state ($P_0$).

At step 416 (FIG. 4B), the compute node 120 may receive the message from the power management agent 210 indicated at step 414 and may change its processor 260 state to the new power state ($P_{cNew}$). As such, the power state ($P_{cNew}$) of the compute node 120 processor 260 may comprise a value that falls between the minimum processor state minus one state ($P_{n-1}$) and the maximum processor state ($P_0$). In this regard, the compute node 120 processor 260 may operate at a relatively higher power utilization level.

At step 418, it may be determined as to whether a utilization decrease in the compute node 120 processor 260 has been detected. A determination of whether a compute node 120 processor 260 utilization decrease has been detected may be made, for instance, if at least one or both of the power management agent 210 and the compute node 120 receives an indication that the compute node 120 has completed the assigned task or is otherwise scheduled to operate at a relatively lower power utilization level.

If the compute node 120 processor 260 utilization has not been detected as decreasing, the compute node 120 may continue operating at the current power state ($P_c=P_{cNew}$), as indicated at step 420. In addition, the compute node 120 may continue operating at the current power state ($P_c=P_{cNew}$) until a processor 260 utilization decrease for the compute node 120 is detected at step 418.

At step 422, if a decrease in the compute node 120 processor 260 utilization level has been detected, the compute node 120 may increase its processor 260 power state ($P_{cNew}$) down to the minimum processor state ($P_n$). In addition, the compute node 120 may send a message to the power management agent 210 to indicate that the compute node 120 processor 260 power state has been increased, at step 424. The level to which the power state ($P_{cNew}$) may be increased may be based upon, for instance, one or more of the following factors. By way of example, a relatively simple algorithm may increase the power state ($P_c$) to the next highest power state (Pc-1). As another example, a relatively more sophisticated algorithm may select the power state ($P_c$) based upon the amount of processing resources required by the processor 260 utilization decrease at step 418.

The power management agent 210 may update internal records and the values of the current power consumption levels of the compute nodes 120 at step 426. In addition, step 406 (FIG. 4A) may be repeated to determine whether the utilization levels of the compute nodes 120 are to be increased. Moreover, steps 408-426 may be repeated. As such, the method 400 may be repeated in a substantially continuous basis to therefore substantially continuously control the compute nodes 120 such that they operate within power budget limits. In addition, the method 400 may be performed to substantially prevent the compute nodes 120 from exceeding an allowable power budget and therefore operates as a substantially pre-emptive measure to reduce power consumption in the operation of the compute nodes 120.

With particular reference now to FIGS. 5A-5D, the method 500 may be initiated at step 502 in response to any of a number of stimuli or conditions. For instance, the method 500 may be initiated with activation of the components in the compute nodes 120 of the compute node pool. In addition, or alternatively, the method 500 may be manually initiated or the power management agent 210 may be programmed to initiate the method 500 at various times, for a set duration of time, substantially continuously, etc.

Once initiated, the power state ($P_c$) of a compute node 120 processors 260 may be set to a minimum processor state ($P_n$), as indicated at step 504. The minimum processor state ($P_n$) may include a minimum frequency and voltage point, and power consumption level of the processor 260. At step 506, it may be determined as to whether a user has been assigned to the compute node 120. In other words, at step 506, it may be determined as to whether the compute node 120 has been assigned to perform a computing task.

If the compute node 120 has not been assigned to a user, the compute node 120 may continue operating at the current power state ($P_c=P_n$). In addition, the compute node 120 may continue operating at the current power state ($P_c=P_n$) until the compute node 120 is assigned to a user at step 506.

At step 508, if the compute node 120 has been assigned to a user or has otherwise been assigned to perform a computing task, the power state ($P_c$) of the compute node 120 may be assigned to a power state ($P_c$) between the minimum processor state ($P_n$) and a maximum processor state ($P_0$). The level to which the power state ($P_c$) of the compute node 120 is assigned at step 508 may be based upon, for instance, one or more of the following factors. For instance, the power state ($P_c$) may be decreased relatively arbitrarily to the maximum power state ($P_0$). As another example, the power state ($P_c$) may be assigned based upon the power being used in other compute nodes 120. In this example, the power state ($P_c$) may be assigned to a level equivalent to the power states of the other compute nodes 120. As a further example, the power state ($P_c$) may be assigned based upon the type of user of the compute node 120. In any regard, at step 510, the compute node 120 may perform the assigned computations at the assigned power state ($P_c$).

At step 512, the compute node 120 may determine whether a thermal event has occurred. A thermal event may comprise, for instance, the detection of a temperature level that exceeds a predetermined temperature level, the detection of an improperly functioning fan, etc. If a thermal event has not been detected, the compute nodes 120 may continue performing the computations at step 510.

Figure 5A:
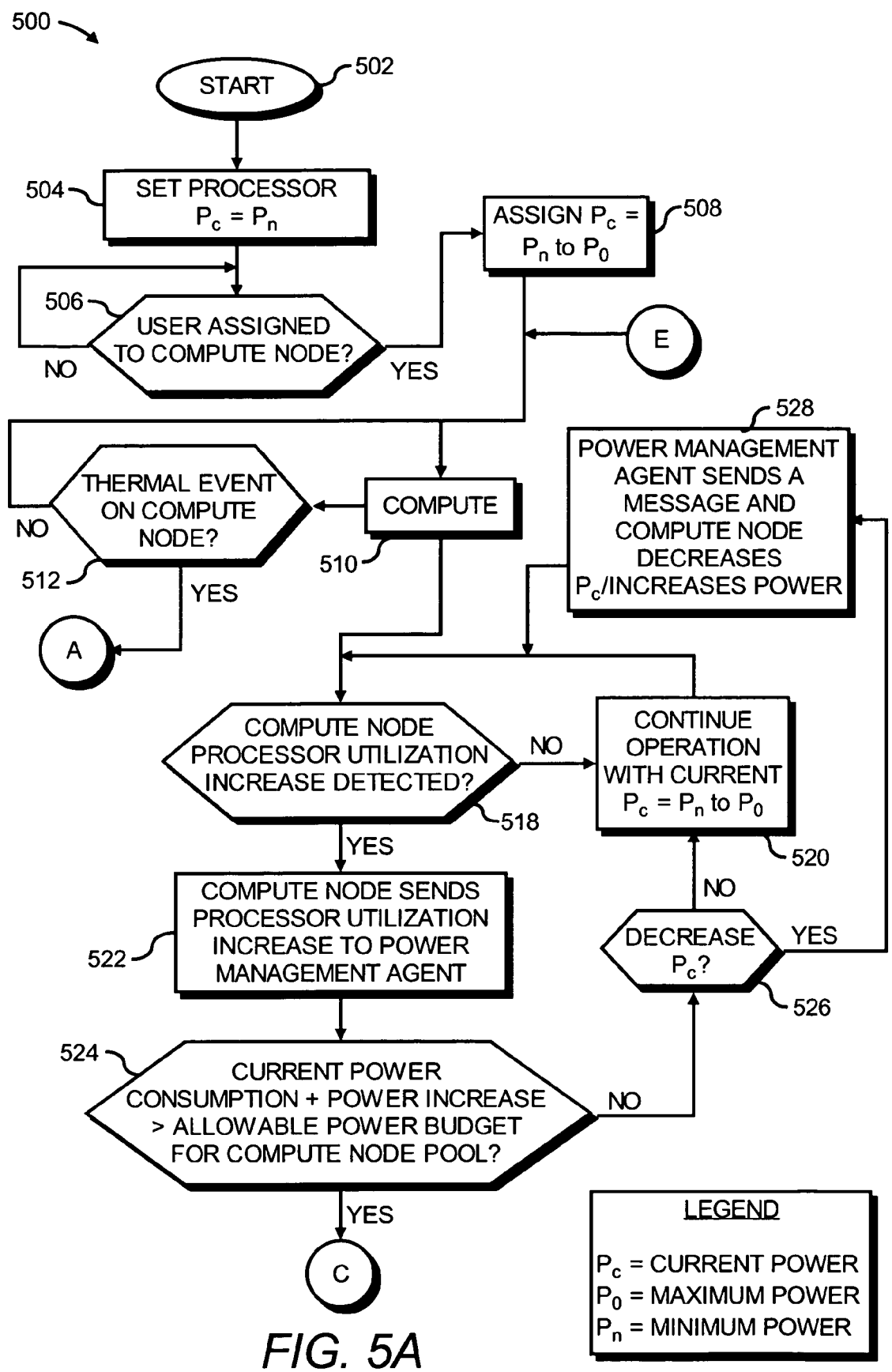
FIGS. 5A-5D, collectively, show a flow diagram for managing power consumption among compute nodes, which depicts the steps in the flow diagram of FIG. 3 in greater detail, according to a second example.
Figure 5D:
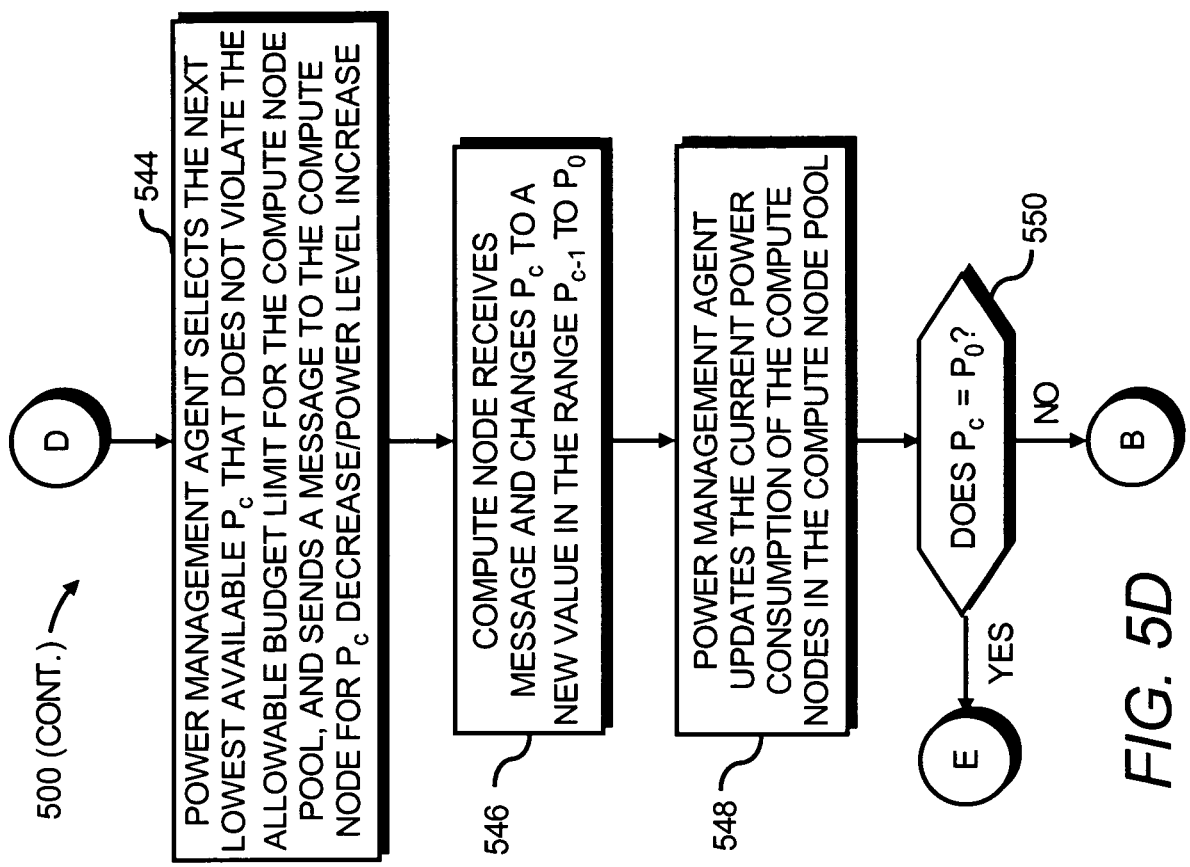
Figure 5B:
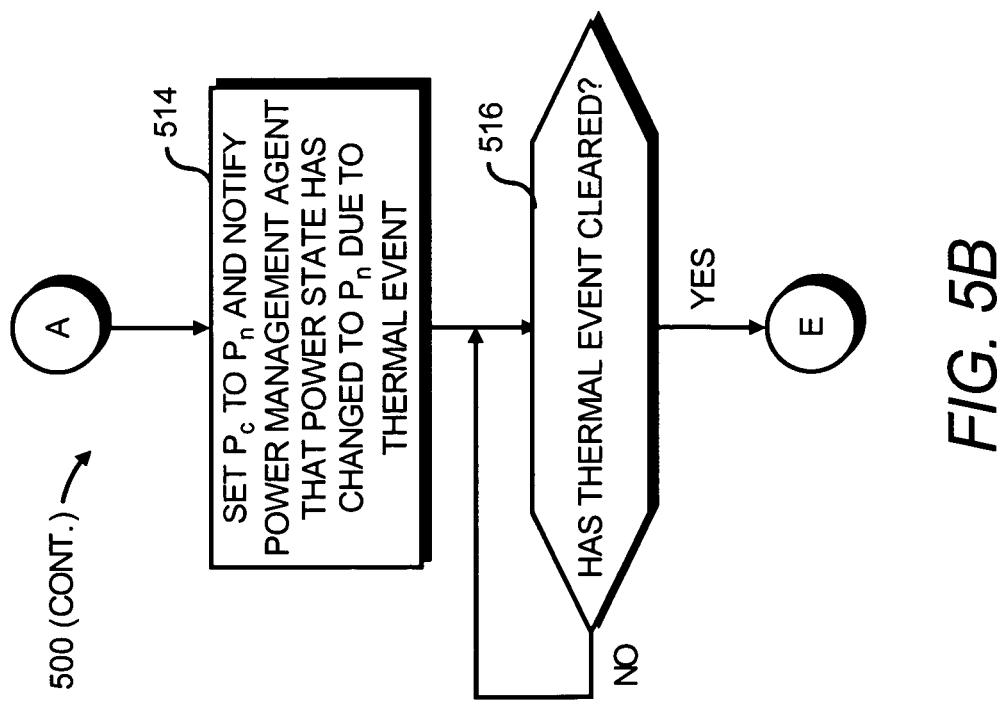

If, however, a thermal event is detected, the compute node 120 may set its power state ($P_c$) to the minimum processor state ($P_n$) at step 514 (FIG. 5B). In addition, the compute node 120 may notify the power management agent 210 of the power state change due to the thermal event. The compute node 120 may further track the thermal event to determine whether the thermal event as cleared, as indicated at step 516. If the thermal event has not cleared at step 516, the compute node 120 may continue to operate at the minimum power state ($P_n$) until it is determined that the thermal event has cleared. A description of the steps following a "yes" condition at step 516 is described herein below with respect to FIG. 5C.

With reference back to FIG. 5A, also following step 510, it may be determined as to whether a compute node 120 processor 260 utilization increase has been detected at step 518. A determination of whether a compute node 120 processor 260 utilization increase has been detected may be made as described above with respect to step 406 (FIG. 4A).

If an increase in the compute node 120 processor 260 utilization has not been detected, the compute node 120 may continue operating at the current power state ($P_c=P_n$ to $P_0$), as indicated at step 520. Here, the power state ($P_c$) equals the power state assigned at step 508, which is between a minimum power state ($P_n$) and the maximum processor state ($P_0$). The compute node 120 may continue operating at the current power state ($P_c=P_n$ to $P_0$) until a processor 260 utilization increase is detected at step 518.

At step 522, if the compute node 120 receives an indication that it has been selected or is otherwise scheduled to perform a computing task requiring an increase in power utilization, the compute node 120 may send a message to the power management agent 210 to inform it that its power state ($P_c$) has been decreased to a level up to a maximum processor state ($P_0$) or some power state ($P_c$) that it has autonomy of changing to without direct permission from the power management agent 210. The maximum processor state ($P_0$) may include a maximum frequency and voltage point, and power consumption level of the processors 260 as described above. The level to which the power state ($P_c$) is to be decreased (power utilization increased) may depend, for instance, upon one or more of the following factors. For instance, the power state ($P_c$) may relatively arbitrarily be decreased to the maximum power state ($P_0$). As another example, the power state ($P_c$) may be assigned based upon the power being used in other compute nodes 120. As a further example, the power state ($P_c$) may be assigned based upon the type of user of the compute node 120.

In any regard, the power management agent 210 may determine whether the sum of the current power consumption levels of the compute nodes 120 in the compute node pool and the power increase in the compute node 120 exceeds an allowable power budget for the compute node pool, as indicated at step 524. The allowable power budget and an associated allowable power budget limit for the compute node pool may be determined as described herein above with respect to step 412 (FIG. 4A).

If the power management agent 210 determines that the sum of the current power consumption levels of the compute nodes 120 in the compute node pool and the power utilization increase for the compute node 120 falls below the allowable power budget, which equates to a "no" condition at step 524, the power management agent 210 may determine whether to decrease the power state ($P_c$) of the compute node 120, at step 526. If the power management agent 210 selects to not decrease the power state ($P_c$) of the compute node 120, the compute node 120 may continue operating at the current power state ($P_c=P_n$ to $P_0$), as indicated at step 520. Again, the compute node 120 may continue operating at the current power state ($P_c=P_n$ to $P_0$) until a processor 260 utilization increase for the compute node 120 is detected at step 518 and the sum of the current power consumption levels of the compute nodes 120 in the compute node pool and the power utilization increase of the compute node 120 exceeds the allowable power budget limit at step 524.

If the power management agent 210 selects to decrease the power state ($P_c$) of the compute node 120, which equates to a "yes" condition at step 526, the power management agent 210 may send a message to the compute node 120 to decrease its power state ($P_c$) to thereby increase its power utilization level and the compute node 120 may decrease its power state ($P_c$) thereby increasing its power utilization, at step 528. The power management agent 210 may select to increase the power state ($P_c$) of the compute node 120 if, for instance, the compute node 120 is operating at a power state level below the maximum power state ($P_0$). In other words, the power management agent 210 may select to increase the power state ($P_c$) of the compute node 120 if the compute node 120 has at least one lower level power state available.

If, at step 524, the power management agent 210 determines that the sum of the current power consumption levels of the compute nodes 120 in the compute node pool and the requested power utilization increase for the compute node 120 exceeds the allowable power budget, the power management agent 210 may send a message to the compute node 120 to increase its power state ($P_c$), as indicated at step 530 (FIG. SC). In other words, the power management agent 210 may send a message to the compute node 120 to vary its power state ($P_c$) to a new power state ($P_{cNew}$), where the new power state ($P_{cNew}$) is at a higher level, for instance, at a power state plus one state ($P_{c+1}$). As such, the power management agent 210 may send a message to the compute node 120 to decrease its power consumption level at step 530.

At step 532, the compute node 120 may receive the message from the power management agent 210 indicated at step 526 and may change its processor 260 state to the new power state ($P_{cNew}$) As such, the new power state ($P_{cNew}$) of the compute node 120 processor 260 may fall between a maximum processor state plus 1 state ($P_{0+1}$) and the minimum processor state ($P_n$). In other words, the power state ($P_{cNew}$) of the compute node 120 processor 260 may be increased such that the power utilization level of the compute node 120 processor 260 may be decreased.

At step 534, the power management agent 210 may determine whether the current power consumption level of the compute nodes 120 falls below the allowable power budget for the compute node pool. If the power management agent 210 determines that the current power consumption level of the compute nodes 120 exceeds the allowable power budget, which equates to a "no" condition at step 534, the power management agent 210 may select a compute node 120 from the compute node pool to move to a higher power level ($P_c$)/lower power level at step 536.

At step 538, the power management agent 210 may determine whether it has selected the current compute node 120 for the power state ($P_c$) increase and associated power level decrease. If the power management agent 210 has not selected the current compute node 120, the current compute node 120 may continue to operate at the new power state ($P_{cNew}$), which comprises a power state between a maximum processor state plus 1 state ($P_{0+1}$) and the minimum processor state ($P_n$), as indicated at step 540. The current compute node 120 may continue operating at the current power state ($P_c = P_{cNew}$) until the current power consumption level falls below the allowable power budget for the compute node pool at step 534 or until the current compute node 120 is selected for power state ($P_c$) increase at step 538. Step 534 may also be performed following the clearing of a thermal event indicated at step 516 (FIG. 5B).

If, however, the power management agent 210 has selected the current compute node 120 for the power state ($P_c$) increase, the power management agent 210 may send a message to the current compute node 120 to increase its power state ($P_c$), as indicated at step 530. In addition, steps 532-538 may be repeated.

With reference back to step 534, if the power management agent 210 determines that the current power consumption level falls below the allowable power budget for the compute node pool, the power management agent 210 may determine whether changing the power state ($P_c = P_{cNew}$) of the compute node 120 to a new value in the range of the current power state minus 1 state ($P_{c-1}$) to the maximum power state ($P_0$) will violate the allowable power budget, at step 542. In other words, at step 542, the power management agent 210 may determine whether the power utilization of the compute node 120 may be increased by decreasing the current power state ($P_c = P_{cNew}$) without violating the allowable power budget.

If the power management agent 210 determines that changing the power state ($P_c$) from the current power state ($P_c = P_{cNew}$) to a new power state between the current power state minus 1 state ($P_{c-1}$) and the maximum power state ($P_0$) will violate the allowable power budget, which equates to a "yes" condition at step 542, the compute node 120 may continue operating at the current power state ($P_c = P_{cNew}$), as indicated at step 540.

If, however, the power management agent 210 determines that changing the power state ($P_{cNew}$) will not violate the allowable power budget, which equates to a "no" condition at step 542, the power management agent 210 may select the next lowest available power state ($P_c$) that does not violate the allowable budget limit for the compute node pool at step 544 (FIG. 5D). In addition, the power management agent 210 may send a message to the compute node 120 to decrease its power state ($P_c$) to the selected power state ($P_{cNew}$) to thereby increase its power utilization level.

At step 546, the compute node 120 may receive the message sent from the power management agent 210 and may decrease its power state ($P_c$) to a new value in the range of the current power state ($P_c = P_{cNew}$), which is ($P_{c-1}$), and the maximum power state ($P_0$). In addition, the power management agent 210 may update the current power consumption level of the compute nodes 120 in the compute node pool, as indicated at step 548.

Figure 5C:
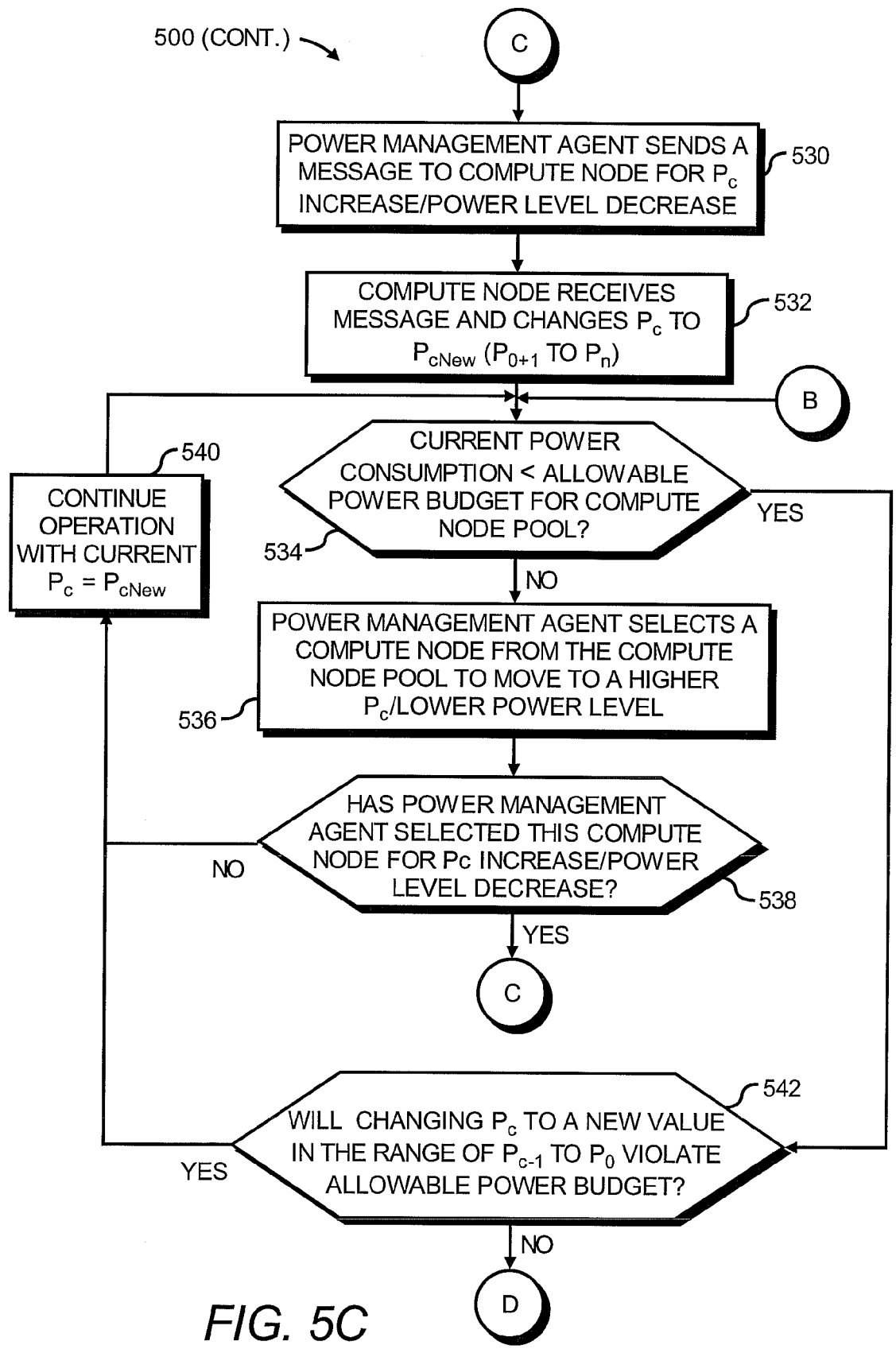

The power management agent 210 may also determine whether the compute node 120 is at the maximum power state ($P_0$) at step 550. If the compute node 120 is at the maximum power state ($P_0$), the method 500 may be repeated beginning at step 510 (FIG. 5A). If, however, the compute node 120 is not at the maximum power state ($P_0$), the method 500 may be repeated beginning at step 534 (FIG. 5C).

The method 500 may be repeated in a substantially continuous manner to therefore substantially continuously control the compute nodes 120 such that they operate within power budget limits. In addition, the method 500 may be performed to reduce the power states of the compute nodes 120 after it has been determined that the current power consumption level of compute nodes 120 exceeds an allowable power budget and therefore operates as a substantially reactive measure to reduce power consumption in the operation of the compute nodes 120.

Some or all of the operations set forth in the methods 300, 400, and 500 may be contained as a utility, program, or subprogram, in any desired computer accessible medium. In addition, the methods 300, 400, and 500 may be embodied by a computer program, which may exist in a variety of forms both active and inactive. For example, it can exist as software program(s) comprised of program instructions in source code, object code, executable code or other formats. Any of the above can be, embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 6:
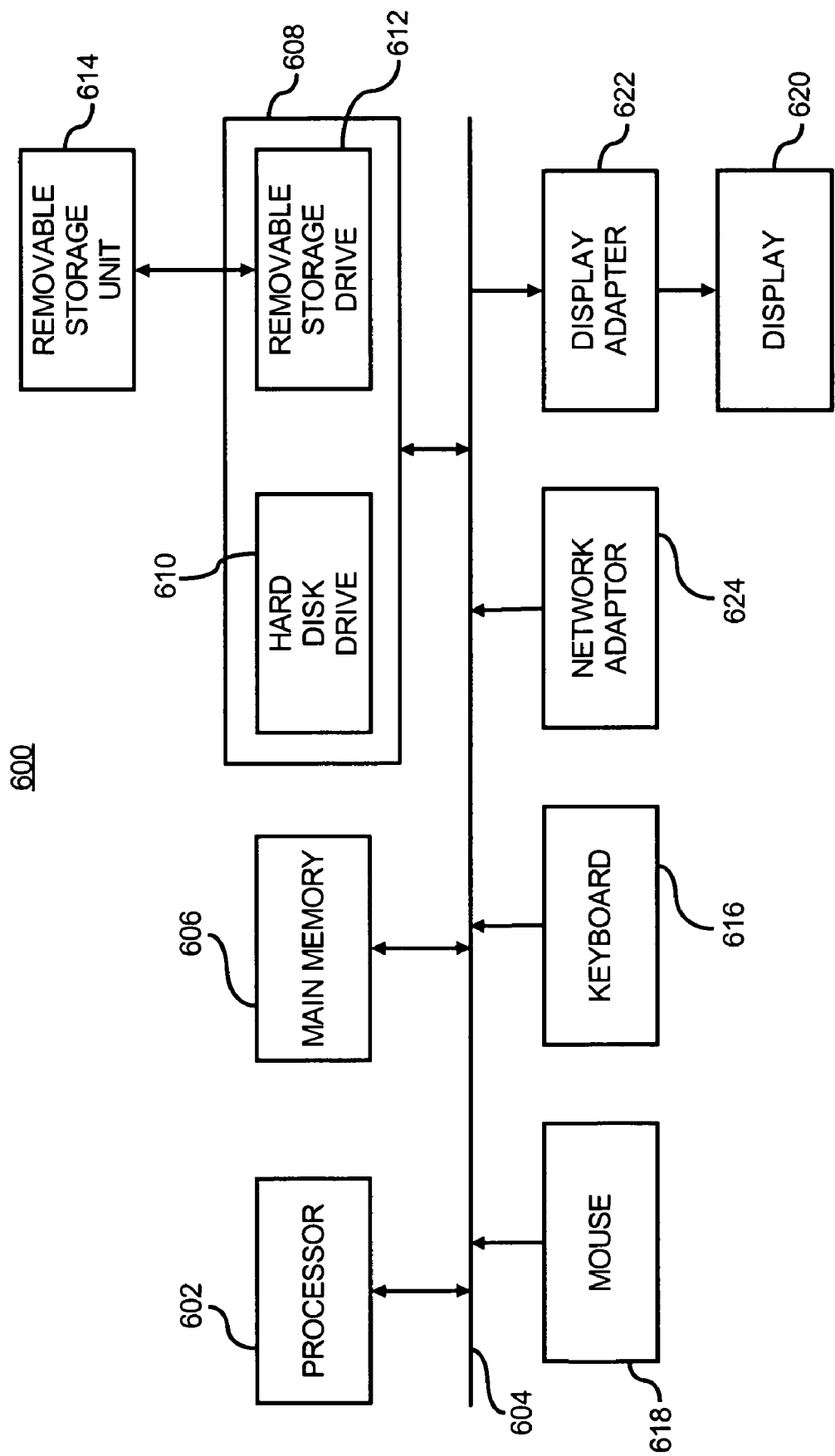
FIG. 6 illustrates a computer system, which may be employed to perform various functions described herein, according to an embodiment of the invention.

FIG. 6 illustrates a computer system 600, which may be employed to perform the various functions of the power management system 210 described herein above, according to an example. In this respect, the computer system 600 may be used as a platform for executing one or more of the functions described hereinabove with respect to the power management agent 210.

The computer system 600 includes one or more controllers, such as a processor 602. The processor 602 may be used to execute some or all of the steps described in the methods 300, 400, and 500. Commands and data from the processor 602 are communicated over a communication bus 604. The computer system 600 also includes a main memory 606, such as a random access memory (RAM), where the program code for, for instance, the power management agent 210, may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for the management of power may be stored.

The removable storage drive 610 reads from and/or writes to a removable storage unit 614 in a well-known manner. User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor 602 may communicate over a network, for instance, the Internet, LAN, etc., through a network adaptor 624.

It will be apparent to one of ordinary skill in the art that other known electronic components may be added or substituted in the computer system 600. In addition, the computer system 600 may include a system board or blade used in a rack in a data center, a conventional "white box" server or computing device, etc. Also, one or more of the components in FIG. 6 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for managing power consumption among compute nodes having respective power components, said power components having a plurality of power utilization levels, said method comprising:
    after a setting of power utilization levels of the compute node power components to a minimum power utilization level, assigning the power utilization level of a first compute node power component to a level higher than the minimum power utilization level in response to a determination that the first compute node has been assigned to a user;
    determining whether an increase in the power consumption level of the compute nodes is detected;
    comparing the increase in power consumption level of the compute nodes with an allowable power budget for a compute node pool containing the compute nodes in response to the increase in the power consumption level of the compute nodes being determined;
    varying a power utilization level of the compute nodes in response to the comparison;
    determining whether a current power consumption level of the compute nodes falls below the allowable power budget for the compute node pool in response to varying the power utilization level to a lower utilization level; and
    determining whether an increase in the power utilization level of the first compute node power component will cause the power consumption level of the compute nodes to exceed the allowable power budget for the compute node pool in response to the current power consumption level falling below the allowable power budget.

2. The method according to claim 1, wherein comparing the increase in the power consumption levels of the compute nodes with an allowable power budget for the compute nodes further comprises determining whether the power consumption levels of the compute nodes falls below the allowable power budget for the compute nodes.

3. The method according to claim 2, wherein varying the power utilization level of the compute nodes further comprises decreasing the power utilization level of the first compute node power component in response to the increase in power consumption level of the compute nodes exceeding the allowable power budget for the compute node pool.

4. The method according to claim 1, further comprising:
    selecting a next highest available power utilization level that allows the power consumption level of the compute nodes to remain within the allowable power budget for the compute node pool in response to a determination that an increase in the power utilization level of the first compute node power component will not cause the power consumption level of the compute nodes to exceed the allowable power budget for the compute node pool; and
    increasing the power utilization level of the first compute node power component to the selected next highest available power utilization level to thereby increase the power utilization of the first compute node.

5. The method according to claim 1, further comprising:
    selecting a compute node from the compute node pool to move to a decreased power utilization level in response to the current power consumption level exceeding the allowable power budget;
    determining whether the selected compute node comprises the first compute node; and
    decreasing the power utilization level of the first compute node power component in response to the selected compute node comprising the first compute node.

6. The method according to claim 1, further comprising:
    determining whether a thermal event has occurred on the first compute node; and
    decreasing the power utilization level of the first compute node power component to the minimum power utilization level in response to a determination that a thermal event has occurred.

7. The method according to claim 6, further comprising:
    determining whether the thermal event has cleared; and
    performing a computational task on the first compute node in response to a determination that the thermal event has cleared.

8. The method according to claim 1, wherein the increase of the power utilization level of the first compute node component further comprises varying at least one of a voltage and frequency of a processor, varying a power utilization level of a memory disk, and varying a spin rate of a memory disk.

9. The method according to claim 1, further comprising varying the power utilization level of the first compute node power component in a non-incremental manner.

10. A power management agent for managing power consumption of compute nodes having respective power components, said power components having a plurality of power utilization levels, said power management agent comprising:
    a module for determining a power budget limit for the compute nodes;
    a module for determining a power consumption level of the compute nodes, said module for determining a power consumption level of the compute nodes being configured to determine a current power consumption level of the compute nodes, wherein the module for determining a power consumption level of the compute nodes is further configured to determine whether a current power consumption level of the compute nodes is below the allowable power budget for the compute node pool;
    a module for comparing the power consumption level of the compute nodes and the power budget limit; and
    a module for varying power utilization levels of one or more power components associated with a first compute node of the compute nodes based upon comparisons made by the module for comparing, wherein the module for varying the power utilization levels is further configured to, after a setting of the power utilization levels of the compute node power components to a minimum power utilization level, assign the power utilization levels of the one or more power components associated with the first compute node to a level higher than the minimum power utilization level in response to a determination that the first compute node has been assigned to a user, wherein the module for varying is further configured to determine whether an increase in the power utilization level of the first compute node power component will cause the power consumption level of the compute nodes to exceed the allowable power budget for the compute node pool in response to the current power consumption level falling below the allowable power budget.

11. The power management agent according to claim 10, wherein the module for varying is further configured to increase the power utilization levels of the one or more power components to thereby increase the power utilization level of the one or more power components in response to the power consumption level of the compute nodes falling below the allowable power budget for the compute nodes.

12. The power management agent according to claim 10, wherein the module for varying is further configured to decrease the power utilization levels of the one or more power components in response to the power consumption levels of the compute nodes exceeding the allowable power budget for the compute nodes.

13. The power management agent according to claim 12, wherein the module for varying is further configured to select a next highest available power utilization level that allows the power consumption level of the compute nodes to remain within the allowable power budget for the compute node pool in response to a determination that an increase in the power utilization level of the first compute node power component will not cause the power consumption level of the compute nodes to exceed the allowable power budget and to increase the power utilization level of the first compute node power component to the selected next highest available power utilization level to thereby increase the power utilization of the first compute node.

14. The power management agent according to claim 10, further comprising:
a module for determining whether a thermal event has occurred in one or more of the compute nodes, said module for determining whether a thermal event has occurred being configured to decrease the power utilization level of the one or more compute nodes to the minimum power utilization level in response to a determination that a thermal event has occurred.

15. The power management agent according to claim 10, wherein the compute nodes comprise blade PCs.

16. A system for managing power among compute nodes having respective power components, said power components having a plurality of power utilization levels, said system comprising:
means for detecting a power consumption level of the compute nodes, said means for detecting being configured to detect an increase in the power consumption level of the compute nodes;
means for comparing the power consumption level of the compute nodes with an allowable power budget for a compute node pool; and
means for varying power utilization levels of the power components based upon comparisons made by the means for comparing, wherein the means for varying the power utilization levels is further configured to, after a setting of the power utilization levels of the compute node power components to a minimum power utilization level, assign the power utilization level of the power component of a first compute node of the compute nodes to a level higher than the minimum power utilization level in response to a determination that the first compute node has been assigned to a user;
means for determining whether a current power consumption level of the compute nodes is below the allowable power budget for the compute node pool; and
means for determining whether an increase in the power utilization level of the first compute node power component will cause the power consumption level of the compute nodes to exceed the allowable power budget for the compute node pool in response to the current power consumption level falling below the allowable power budget.

17. The system according to claim 16, further comprising:
means for detecting a thermal event in one or more compute nodes; and
wherein the means for varying is further configured to reduce the power utilization levels of the one or more compute nodes in response to a detected thermal event in the one or more compute nodes by the means for detecting.

18. A computer program product embodied on a computer-readable storage device and comprising code that, when executed, causes a computer to perform the following:
after a setting of the power utilization levels of compute nodes having respective power components to a minimum power utilization level, assign the power utilization level of a first compute node power component to a level higher than the minimum power utilization level in response to a determination that the first compute node has been assigned to a user;
determine whether an increase in a power consumption level of the compute nodes is detected;
compare the increase in power consumption level of the compute nodes with an allowable power budget for a compute node pool containing the compute nodes in response to the increase in the power consumption level of the compute nodes being determined;
vary a power utilization level of the first compute node power component in response to the comparison;
determine whether a current power consumption level of the compute nodes falls below the allowable power budget for the compute node pool in response to varying the power utilization level to a lower utilization level; and
determine whether an increase in the power utilization level of the first compute node power component will cause the power consumption level of the compute nodes to exceed the allowable power budget for the compute node pool in response to the current power consumption level falling below the allowable power budget.

* * * * *

UNITED STATES PATENT AND TRADEMARK OFFICE
CERTIFICATE OF CORRECTION

PATENT NO.       : 7,647,516 B2
APPLICATION NO.  : 11/232526
DATED            : January 12, 2010
INVENTOR(S)      : Parthasarathy Ranganathan et al.

It is certified that error appears in the above-identified patent and that said Letters Patent is hereby corrected as shown below:

In column 15, line 61, in Claim 2, delete "levels" and insert -- level --, therefor.

In column 15, line 64, in Claim 2, delete "levels" and insert -- level --, therefor.

In column 17, line 29, in Claim 12, delete "levels" and insert -- level --, therefor.

Signed and Sealed this

Second Day of November, 2010

David J. Kappos
*Director of the United States Patent and Trademark Office*